United States Patent
Johnson (12)

(10) Patent No.: US 8,479,686 B2
(45) Date of Patent: Jul. 9, 2013

(54) PET FEEDER SYSTEM FOR A HANDICAPPED PET OWNER

(71) Applicant: Matthew T. Johnson, Chicago, IL (US)

(72) Inventor: Matthew T. Johnson, Chicago, IL (US)

( * ) Notice: Subject to any disclaimer, the term of this patent is extended or adjusted under 35 U.S.C. 154(b) by 0 days.

(21) Appl. No.: 13/645,154

(22) Filed: Oct. 4, 2012

(65) Prior Publication Data

US 2013/0112146 A1    May 9, 2013

Related U.S. Application Data

(60) Provisional application No. 61/555,081, filed on Nov. 3, 2011.

(51) Int. Cl.
*A01K 5/01*    (2006.01)

(52) U.S. Cl.
USPC ...................................... 119/61.57; 119/51.5

(58) Field of Classification Search
USPC ............. 119/51.01, 51.5, 52.1, 72, 74, 61.57, 119/61.5, 61.1, 61.2, 58, 60; D30/121; 248/407, 248/423, 295.11, 297.31
See application file for complete search history.

(56) References Cited

U.S. PATENT DOCUMENTS

| | | | | |
|---|---|---|---|---|
| 1,594,290 A * | 7/1926 | Woessner et al. | ............... | 119/72 |
| 3,145,007 A * | 8/1964 | Swinney | ........................ | 248/149 |
| 3,651,787 A * | 3/1972 | Cooper | ...................... | 119/51.01 |
| 3,661,121 A * | 5/1972 | Zielin | ........................ | 119/61.57 |
| 3,782,332 A * | 1/1974 | Depenthal et al. | ......... | 119/51.13 |
| 4,205,629 A * | 6/1980 | Wix | ............................. | 119/51.5 |
| 4,658,759 A * | 4/1987 | Brown | ......................... | 119/61.5 |
| 4,976,223 A * | 12/1990 | Pierce | ......................... | 119/61.56 |
| 5,000,124 A * | 3/1991 | Bergen | ............................. | 119/63 |
| 5,054,431 A * | 10/1991 | Coviello | ................... | 119/61.56 |
| 5,501,176 A * | 3/1996 | Tully | ........................... | 119/61.57 |
| 5,584,263 A * | 12/1996 | Sexton | ........................ | 119/51.5 |
| D490,191 S * | 5/2004 | Mollohan et al. | ............ | D30/121 |
| 7,318,391 B2 * | 1/2008 | Brillon | ........................ | 119/61.57 |
| 8,001,931 B2 * | 8/2011 | Deese et al. | ............... | 119/61.57 |
| 8,082,883 B2 * | 12/2011 | Aletti | ........................ | 119/61.57 |
| 8,196,549 B2 * | 6/2012 | Seagraves | ..................... | 119/477 |

* cited by examiner

*Primary Examiner* — T. Nguyen
(74) *Attorney, Agent, or Firm* — Howard B. Rockman

(57) ABSTRACT

A pet feeding and watering system that dispenses pet food and water and has an adjustable height for people with limited mobility. The system has a base platform and a dual food and water dispenser. The dual food and water dispenser includes a vertical chute and a vertical hose. The vertical chute include a plurality of plastic or plexiglass panels that are spaced evenly from the top interior of the chute to the base of the chute in a zigzag configuration. The top of the chute has an open receptacle end where food and water are placed. The vertical hose is attached to the side of the chute by bracket fasteners and runs the length of the chute. The base of the chute includes a funnel mechanism that receives the vertical hose and directs water into a water dish. The chute includes at least one sliding component and one fixed component, where the fixed component has notches that engage a handle attached to the sliding component to secure the chute to the desired height. The pet feeding and watering system can also include a plastic pitcher, marked with incremental measurements, for pouring appropriate amounts of water into the water dispenser. When not in use, the pitcher rests in the chute's open receptacle end.

19 Claims, 3 Drawing Sheets

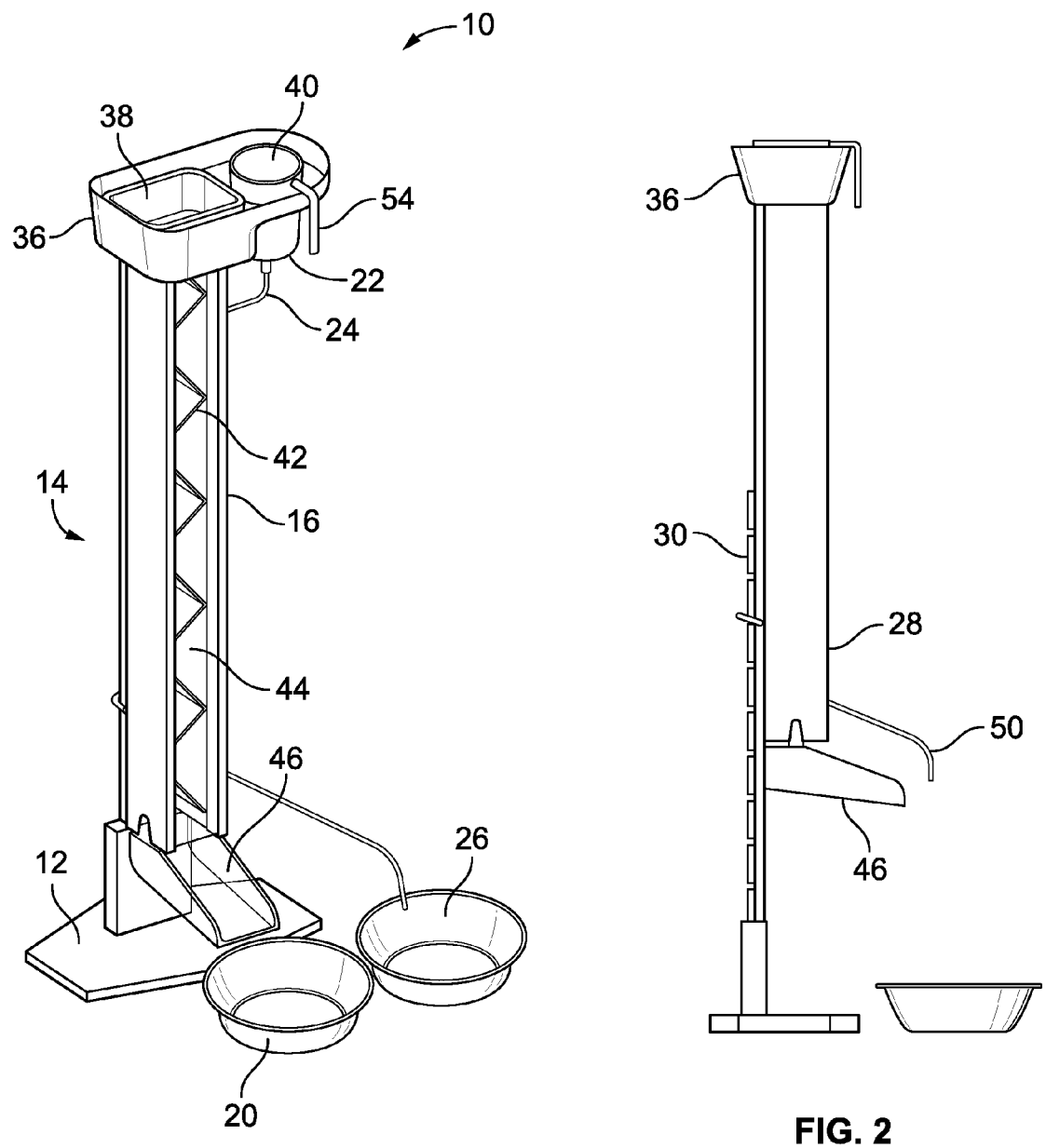

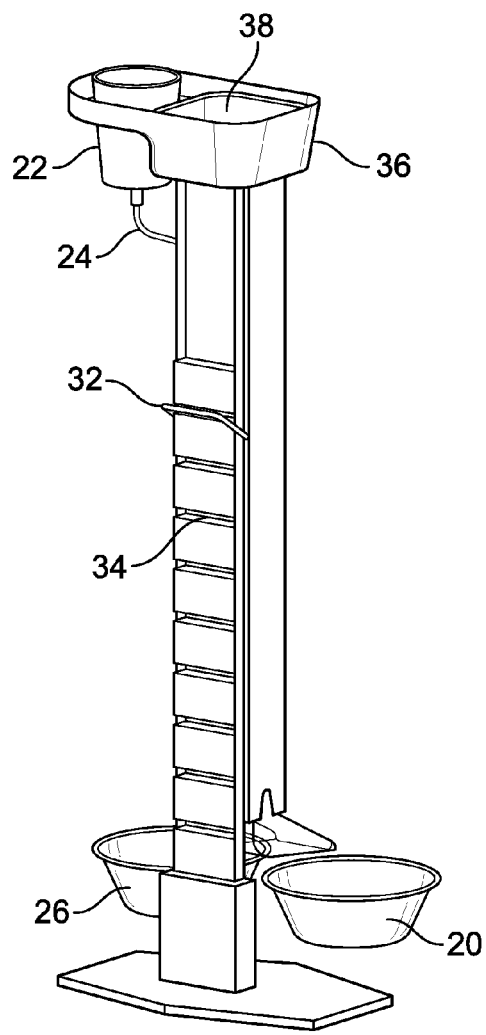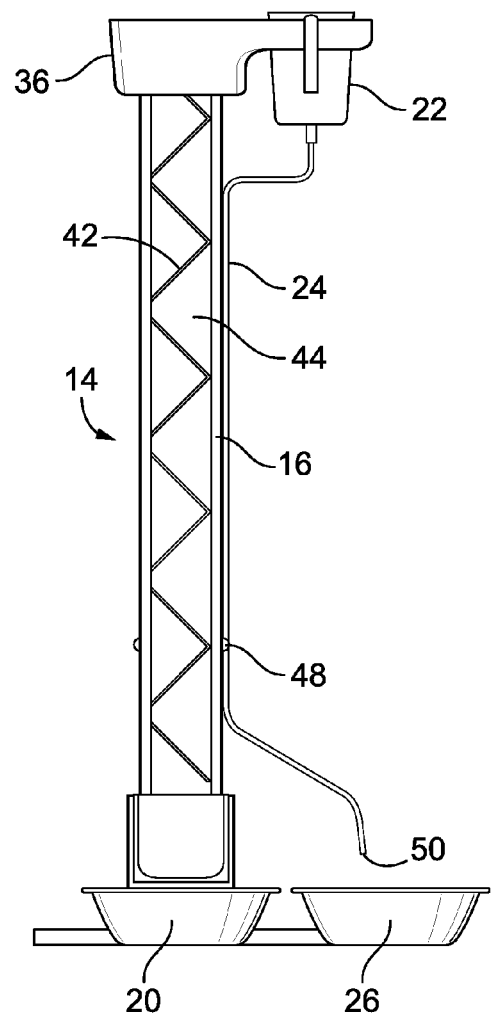
FIG. 3
FIG. 4

PET FEEDER SYSTEM FOR A HANDICAPPED PET OWNER

This application claims priority of provisional application Ser. No. 61/555,081, filed on Nov. 3, 2011, to the extent allowed by law.

BACKGROUND OF THE INVENTION

1. Field of the Invention

The present invention relates to a feeder system for pets, and more particularly to a feeder system for pets that provides pet owners, particularly those who suffer limited mobility and are thus physically incapable of bending over to refill an animal's food or water dish, a more practical and comfortable means of providing for their pet's most basic needs.

2. Description of the Prior Art

America is a country of dog and cat lovers. In fact, according to the American Pet Products Manufacturers Association, (APPMA), there are approximately 60 million owned dogs in the United States and 75 million owned cats. A simpler means of understanding these figures is to say that four in ten households include a family dog, while nearly three in ten include a pet cat. Why do so many people have pets? The answer to that question is simple; pets provide unconditional love, companionship and unmatched loyalty to their owners. While dogs are known to provide protection and happy companionship, cats are more independent, yet nonetheless still offer love and warmth. Schedules of feeding are just as important to an animal as they are to a human, and conscientious pet owners feed their pet at set times and in a set location within or outside the home.

While there is little dispute that providing food and water to a dog or cat is an essential aspect of pet ownership, doing so can be challenging to many pet owners. Specifically, over 54 million Americans suffer from some form of limited mobility, and for them the act of bending over and lifting a heavy feeding dish is not an option. Limited mobility can result from a variety of causes such as arthritis, muscle deterioration or inactivity. This is particularly prevalent in the older population where musculoskeletal disabilities, medical conditions and visual impairment can result in back pain, arthritis or other conditions that can cause the person to suffer a loss of dexterity. Unfortunately for the millions of caring pet owners who suffer the short term or long term effects of limited mobility, even the simple task of feeding their animal can be rife with challenges. As such, these pet owners often have no other choice but to give away a beloved dog or cat, simply because they are not physically capable of caring for the pet's most basic needs. Considering that dogs and cats are loving companions that provide much comfort and amusement, especially to those who live alone, it is tragic that caring pet owners should give up their pets, simply because they are unable to lift up a food dish.

U.S. Pat. No. 3,527,191 discloses an automatic pet feeding and watering device that consists of a food dispensing hopper supported on legs extending from each inwardly tapering corner of the hopper. A food agitator and a conveying worm shaft is supported in the hopper for conveying the food therein to a chute at one side leading to at least one food pan between two adjacent legs. A closed water tank is secured between two other adjacent legs, with a downward discharge pipe beneath which a water trough is placed, the pipe extending below the trough sides but above its bottom, the end of the pipe determining the water level in the trough. A timed motor rotates the food agitator shaft, and through a pair of cooperating bevel gears, a second shaft operates a water control shaft in the tank downwardly extending pipe, for also dispensing the water simultaneously with the food. The automatic pet feeding device of U.S. Pat. No. '191 can be made small enough for a bird cage or big enough for cats, dogs, and horses. Although the device disclosed in U.S. Pat. No. '191 is meant for automatic feeding, people of limited mobility would not be able to fill the food hopper and water tank.

U.S. Pat. No. 4,947,796 discloses a dog feeder apparatus that includes a plurality of tanks and associated trays. A water tank provides fluid to a forwardly oriented bowl assembly and a food tank provides dry-type dog food to a forwardly oriented second bowl assembly. The dog feeder apparatus also includes an intercommunicating manually reciprocatable valve that enables fluid from the water bowl to enter a perimeter through the dry dog food bowl to effect moisturizing of the dry dog food. The food tank is refillable by removing the top of the tank and the water tank is refillable by removing the water tank entirely. The dog feeder apparatus of the '796 patent is not designed for people with limited mobility. A person using the dog feeder discloses in the '796 patent would have to bend down to refill the food tank and would have to bend down to remove the water tank, fill the water tank, and bend down again to replace the water tank.

U.S. Pat. No. 5,819,686 discloses an animal feeder that includes a food supply hopper disposed in the middle of a water reservoir means for containing a water supply, which encircles the food supply hopper. The feeder also includes a food trough, operatively associated with the outlet for dispensing the animal food that includes an extension member that extends above and beyond the water reservoir. The food trough includes a weather guard encasement and a door. The water reservoir includes a valve means that connects to a water supply. The animal pushes the door open and eats the food from the food trough and drinks from the water reservoir. The user loads the hopper by removing the lid on top and filling with dry pet food. The user connects a water supply, such as a garden hose, to the valve means and as the water level in the water reservoir decreases, the float in the valve decreases and allows water from the water supply to flow through and fill the water reservoir. As the water in the water reservoir rises, the float rises and cuts off the water supply. The animal feeder of the '686 patent is not intended for people of limited mobility as they have to connect the water supply and bend down to refill the hopper as needed.

The prior art to date does not disclose the unique pet feeder with adjustable dispensers to allow people of limited mobility to provide food and water for their pets. None of the prior art can be combined in a way to suggest these necessary modifications. There is no teaching, suggestion, or motivation that would have enabled a person of ordinary skill in the art to modify any prior art pet feeder to allow for adjustable dispensers.

It is a primary object of the present invention is to provide a unique pet food and water product that offers pet owners who suffer limited mobility a sensible solution to the aforementioned challenges.

It is another object of the present invention to provide a unique pet food and water product that provides pet owners with an easy and convenient means of keeping their animals fed and hydrated without having to kneel, bend or otherwise stoop to the ground in order to do so.

It is yet another object of the present invention to provide a unique pet food and water product that ensures that pet owners do not over or under feed their pet.

It is yet another object of the present invention to provide a unique pet food and water product that includes a zigzag dispensing chute, providing pinball machine action and creating a whimsical display.

SUMMARY OF THE INVENTION

The adjustable pet feeder system of the present invention is a pet feeding station comprised of adjustable dispensers which are positioned directly above an animal's food and water dishes, thus enabling the user to fill the food and water bowls while comfortably standing upright, or even while seated in a chair, mobility scooter or wheelchair. The present pet feeding station can be manufactured primarily of heavy duty and shatterproof plastic material, while plain, treated or painted wood versions of the unit could also be made available.

The adjustable pet feeder system of the present invention comprises a base platform and a dual dispenser mounted to the base platform. The base platform, on which the actual food and water dispenser is securely mounted, is a unique, trapezoid shape and would be sized appropriately to accommodate the actual dispenser unit. The dual dispenser, mounted to this base platform, is comprised of a vertical chute, inside of which food would be poured and delivered directly into a food dish positioned directly below and in front of the unit base. An embodiment can include a funnel mechanism in the open receptacle end at the top of the chute that attaches to a flexible plastic hose that is mounted to the side of the chute, with the user pouring water into the funnel in order to fill the companion water dish.

The chute is generally a two piece unit, rectangular in shape, and measures 38 inches in height when fully extended, with both the width and the depth measuring approximately four inches, and comprises a sliding component and a fixed component that enables the user to raise or lower the height of the chute to accommodate the dimensions of the user's pet's feeding dish, as well as the user's own stature. The sliding component and fixed component have a tongue-in-groove system with either a handle or integrated threaded fasteners that enable the user to lock the chute at the desired height. Positioned at the top of the chute is a rectangular shaped platform and framework that accommodates the chute, as well as the companion water dispenser. A plurality of plastic or plexiglass panels are spaced evenly, in a zigzag configuration, from the top interior to the base of the chute, dividing the chute into a plurality of chambers that ensure that the food cascades down the chute slowly and gently, effectively eliminated spills and preventing the pet owner from inadvertently overfilling the food dish. An open, tapered dispenser nozzle, that directs food directly into the pet's dish, is positioned at the base of the chute.

The companion water dispenser is positioned directly beside the top of the chute and is secured within the device's rectangular framework. The water dispenser is comprised of a square shaped, open ended plastic funnel mechanism, on the base of which a length of flexible plastic tubing is integrally attached. The tubing runs the length of the chute and is secured to the side of the chute by way of a plurality of sturdy bracket fasteners. This tubing would measure several inches longer than the chute itself, with the open end of the tubing designed to be positioned directly over the pet's water dish. To facilitate use, a handy plastic pitcher, marked with incremental measurements, could be included for sale with the adjustable pet feeder. The pitcher is appropriately sized to rest within the chute's open receptacle when not in use and includes an elongated and tapered handle.

BRIEF DESCRIPTION OF THE DRAWINGS

The present invention is further described with reference to the accompanying drawings in which:

FIG. 1 is a front, side perspective view of a first embodiment of the adjustable pet feeder of the present invention.

FIG. 2 is a side elevation view of the first embodiment of the adjustable pet feeder of the present invention.

FIG. 3 is a rear perspective view of the first embodiment of the adjustable pet feeder of the present invention.

FIG. 4 is a side elevation view of the first embodiment of the adjustable pet feeder of the present invention.

DETAILED DESCRIPTION OF THE ILLUSTRATED EMBODIMENTS

Figure 5:
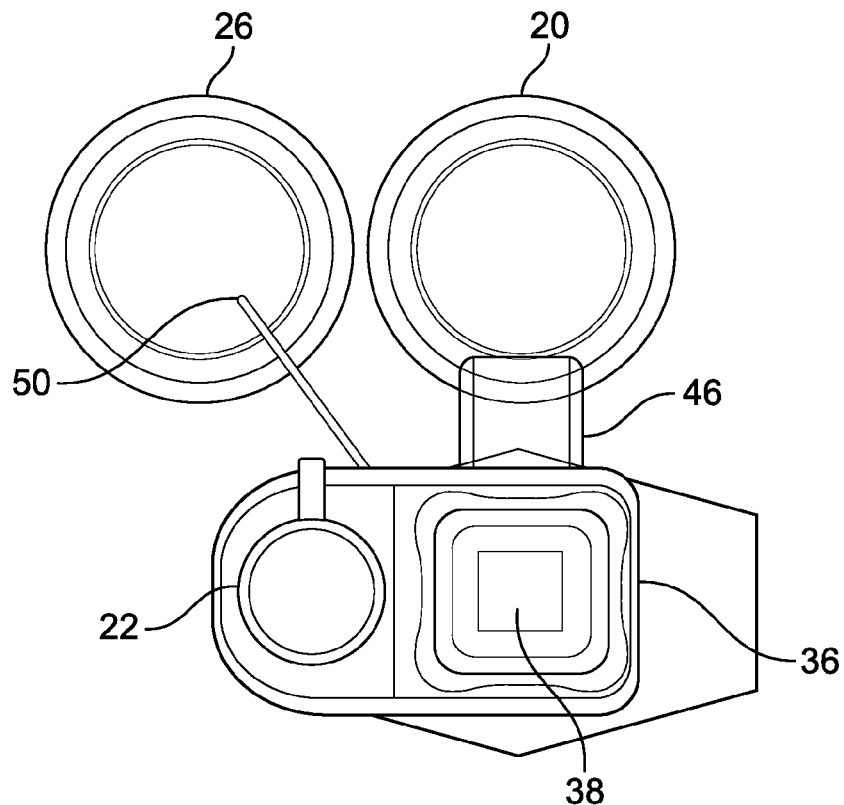
FIG. 5 is a top view of the first embodiment of the adjustable pet feeder of the present invention.

The adjustable pet feeding device 10 of FIG. 1 is comprised of a sturdy base platform 12, on which the actual dual food and water dispenser 14 is securely mounted. The platform 12 is made of a heavy duty and shatterproof plastic material or a sleek wood, features a unique trapezoid shape, and is sized appropriately to accommodate the actual dispenser unit 14. Mounted to base platform 12, the dual dispenser 14 is comprised of a vertical chute 16, inside of which food 18 would be poured and delivered directly into a food dish 20 positioned directly below and in front of the platform 12. A funnel mechanism 22 and flexible plastic hose 24 are mounted to the side of chute 16, with the user pouring water into the funnel 22 to fill the companion water dish 26.

Figure 6:
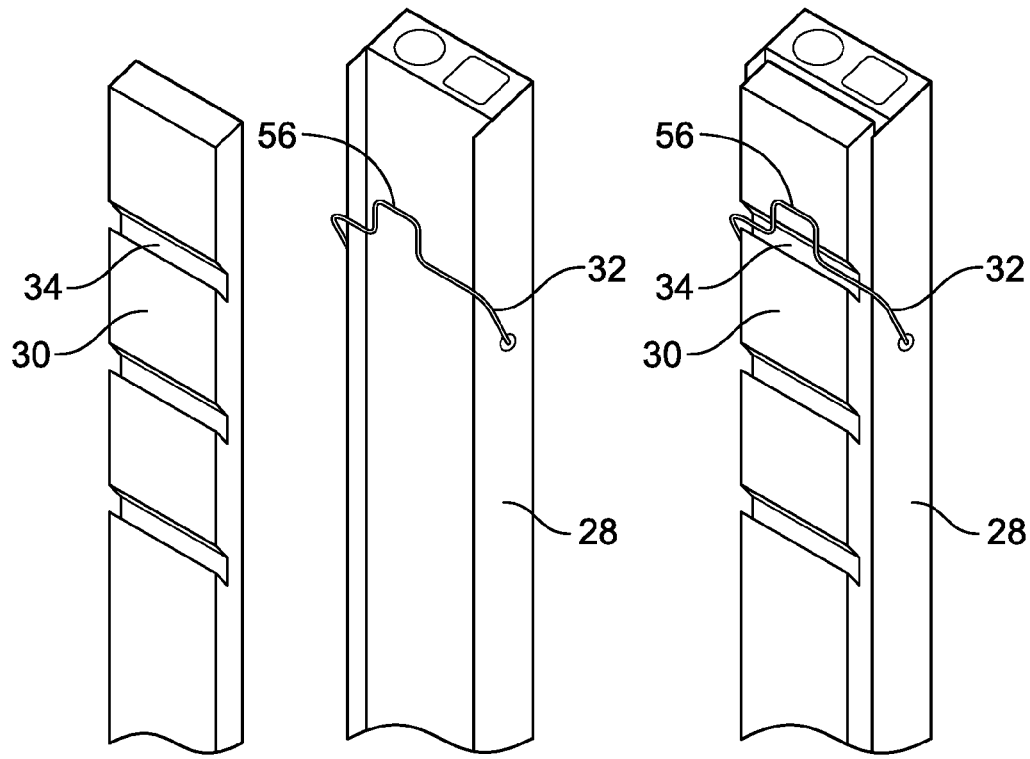
FIG. 6 is a side elevation view of the first embodiment of the adjustable pet feeder of the present invention.

The chute 16, as illustrated, is a two piece unit comprised of sliding component 28 and fixed component 30 that enable the user to raise or lower the height of the chute 16, shown in FIG. 2, to accommodate the dimensions of the pet's feeding dish 20. For practical purposes, the sliding component 28 and fixed component 30 would have a tongue-in-groove system (not shown) with a handle 32 attached to sliding component 28, shown in FIG. 3, that engages notches 34 on fixed component 30 and enables the user to "lock" the chute 16 at the desired height. The handle, shown in FIG. 6, is attached at each end to sliding component 28 and includes a tab 56 half way between each end. The tab 56 hooks into a notch 34 of fixed component 30 at the user's desired height. In an alternate embodiment, the sliding component 28 and fixed component 30 would have a tongue-in-grove system (not shown) with integrated threaded fasteners (not shown) that enable the user to "lock" the chute 16 at the desired height.

Generally rectangular in shape, chute 16 would measure approximately 38 inches in height when fully extended, with both the width and depth of the unit measuring approximately four inches. Positioned at the top of the chute 16 would be a rectangular shaped platform 36 and intake framework 38 that accommodates the chute 16, as well as the companion water dispenser 40. A plurality of plastic or plexiglass panels 42 are spaced evenly, in a zigzag configuration, from the top interior of the chute 16 to the base of the chute 16, dividing the chute 16 into a plurality of chambers 44 that ensure that food cascades down the chute 16 slowly and gently, effectively eliminating spills and preventing the pet owner from inadvertently overfilling the dish 20. An open, tapered dispenser nozzle 46, shown in FIG. 5, that directs food directly into the pet's dish 20, is positioned at the base of the chute 16.

Positioned directly adjacent the top of the chute 16 and secured within the device's 10 rectangular framework 38 is the companion water dispenser 40, comprising the square shaped, open ended plastic funnel mechanism 22, on the base of which the length of flexible plastic tubing or hose 24 is integrally attached. Tubing 24, shown in FIG. 4, runs the length of the chute 16 and is secured to the side of the chute 16 by a series of sturdy bracket fasteners 48. Tubing 24 measures approximately several inches longer than the chute 16 with the open end 50, shown in FIGS. 4 and 5, of the tubing 24 designed to be positioned directly over the pet's water dish 26. To facilitate ease of use, a handy plastic pitcher 52 (not shown), marked with incremental measurements that enable the user to precisely fill the water dish 26, would be included. An elongated and tapered handle 54 (not shown) ensures a comfortable hold on the pitcher 52 and the pitcher 52 is sized appropriately to rest within the chute's 16 open receptacle 50 when not in use, thus facilitating easy access when needed. The pet feeder 10 of the present invention could be sold fully assembled or in an easy to install kit form.

Use of the pet feeder described above is simple, fun and straightforward. First, the user would place the pet feeder 10 in a designated area of the home, such as a kitchen, coat room or other area where the user commonly feeds the pet. According to easily followed package instructions, the user, alone or with the assistance of a friend, would adjust the height of the pet feeder 10 to accommodate both the height of their animal's feeding dishes 20, 26, as well as the user's own stature, by extending sliding component 28 along fixed component 30 and locking tab 56 of handle 32 into notch 34 of fixed component 30. For instance, a wheelchair bound owner of a small dog would position the chute 16 so that the unit's food dispenser nozzle 46 was lower to the ground and directly above the animal's small feeding dish 20 with the top of the chute 16 positioned for easy reach from the wheelchair. Once the desired height of the pet feeder 10 has been ascertained, the user would lock the height into place via the handle or threaded fasteners (not shown) included for sale with the unit. Next, the user would position their animal's feeding dishes 20, 26 directly in front of the base 12 of the unit 10, placing the food dish 20 directly below the extended dispenser nozzle 46 located at the bottom of the chute 16, and placing the water dish 26 directly beside the food dish 20. The user then inserts the flexible plastic tubing or hose 24 that comprises the water dispenser 40 directly above or into the animal's water dish 26, and the unit 10 is ready for use. The user then utilizes the included pitcher 52 to scoop the appropriate amount of dry food 18 from its product packaging, pouring the food 18 directly into the top of the chute 16. This in turn causes the food 18 to carefully travel down through the chute's 16 individual zigzag chambers 44, creating a whimsical and fun display, with the food 18 ultimately landing at a slow velocity directly in the animal's feeding dish 20. The user could then rinse the pitcher 52 clean and fill it with fresh water, pouring this water into the attached funnel mechanism 22 located at the top of the unit 10. This in turn releases the water through the attached tubing 24 that is affixed to the side of the chute 16, with the water dispensed directly into the animal's water dish 26. With the food and water dish filled, the user then calls their dog or cat to dinner! The animal then eats and drinks from its bowls per usual, with the user repeating this process with each feeding.

There are several significant benefits and advantages associated with this unique pet feeder invention. Foremost, the present invention would provide pet owners with an easy and convenient means of keeping their animals fed and hydrated, without having to kneel, bend or otherwise stoop to the ground in order to do so. The pet feeding station can be loaded with fresh food and water while the user is comfortably standing upright or is seated. The present invention enables those pet owners who suffer from limited mobility such as back, muscle or joint pain, as well as infirmities which compromise their ability to stand or walk, a practical means of caring for and feeding their pets. Providing these pet owners a level of independence, use of the present invention effectively enables these individuals to care for their pet's most basic needs on their own, thus insuring they could enjoy the companionship and love that animals provide. Food and water can be poured into the device 10, with the included pitcher 52 marked with incremental measurements that ensure the user does not over or under feed their pet. Consumers can enjoy the fun of watching food travel down the dispenser panels 42, with the zigzag motion harkening to the sounds and images of a pinball machine in action, thus creating a whimsical display. Although designed expressly for general household use, the feeding system of the present invention can also prove a unique and practical device for installation at kennels, boarding establishments and similar pet care facilities.

The foregoing description of illustrated embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A combination pet feeding and watering system comprising:
   a. a base platform;
   b. a dual dispenser mounted to said base platform comprising a vertical chute at least one open receptacle and a vertical hose communicating with said at least one open receptacle;
      said chute comprising at least one sliding element and one fixed element to raise or lower the desired height of the chute and an open end at the top of the chute; and
   c. the vertical hose extending from said at least one open receptacle to said base platform.

2. The pet feeding and watering system of claim 1, wherein said chute includes a means of controlling the speed of the material descending down the length of the chute.

3. The pet feeding and watering system of claim 2, wherein the means of controlling the speed of the food includes at least one baffle plate adapted to guide material passing through the chute.

4. The pet feeding and watering system of claim 3, further comprising a plurality of baffle plates configured in a zigzag orientation from the top interior of the chute down the length of the chute to the base of the chute, said baffle plates dividing the chute into a plurality of chambers.

5. The pet feeding and watering system of claim 3, wherein the at least one baffle plate is made of plastic.

6. The pet feeding and watering system of claim 3, wherein the at least one baffle plate is made of plexiglass.

7. The pet feeding and watering system of claim 1, wherein the chute includes a platform and an intake framework positioned at the top of the chute.

8. The pet feeding and watering system of claim 7, wherein the platform and intake framework accommodate the chute and a water dispenser.

9. The pet feeding and watering system of claim 7, wherein the platform is rectangular in shape.

10. The pet feeding and watering system of claim 1, wherein the base of the chute includes an open, tapered dispenser nozzle, said nozzle directing the food into a food bowl.

11. The pet feeding and watering system of claim 1, wherein the dual dispenser includes a funnel mechanism attached at the open receptacle end at the top of the chute,
   a. said funnel mechanism attached to the vertical hose and adapted to direct water through the vertical hose.

12. The pet feeding and watering system of claim 1, wherein the vertical hose runs the length of the chute.

13. The pet feeding and watering system of claim 1, wherein the vertical hose is secured to the chute by a plurality of bracket fasteners.

14. The pet feeding and watering system of claim 1, wherein the length of the vertical hose is greater than the length of the chute.

15. The pet feeding and watering system of claim 1, wherein the system includes a pitcher marked with incremental measurements.

16. The pet feeding and watering system of claim 15, wherein the pitcher rests in the open receptacle at the top of the chute.

17. The pet feeding and watering system of claim 1, wherein the fixed component includes notches.

18. The pet feeding and watering system of claim 17, wherein the sliding element moveably fixed at said desired height include a tongue-in-groove system with one of a handle and integrated threaded fasteners for locking the chute to said desired height.

19. The pet feeding and watering system of claim 18, wherein the handle includes a tab that latches into the notches in the fixed component for locking the chute to said desired height.

* * * * *